US012563145B2

(12) United States Patent
Soga et al.

(10) Patent No.: US 12,563,145 B2
(45) Date of Patent: Feb. 24, 2026

(54) DIALOGUE MANAGEMENT APPARATUS, DIALOGUE MANAGEMENT SYSTEM, AND DIALOGUE MANAGEMENT METHOD

(71) Applicant: Hitachi Solutions, Ltd., Tokyo (JP)

(72) Inventors: Ryo Soga, Tokyo (JP); Hideto Yamamoto, Tokyo (JP); Masahiko Yasui, Tokyo (JP); Hideyuki Kashiwase, Tokyo (JP); Minoru Kono, Tokyo (JP); Masahiko Inoue, Tokyo (JP); Daisuke Fukui, Tokyo (JP); Emi Saito, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 127 days.

(21) Appl. No.: 18/686,069

(22) PCT Filed: Nov. 10, 2022

(86) PCT No.: PCT/JP2022/041906
§ 371 (c)(1),
(2) Date: Feb. 23, 2024

(87) PCT Pub. No.: WO2023/095629
PCT Pub. Date: Jun. 1, 2023

(65) Prior Publication Data
US 2024/0357038 A1      Oct. 24, 2024

(30) Foreign Application Priority Data
Nov. 29, 2021      (JP) ................................. 2021-192783

(51) Int. Cl.
H04M 3/56          (2006.01)
H04N 7/15          (2006.01)
H04N 21/231        (2011.01)

(52) U.S. Cl.
CPC .............. *H04M 3/56* (2013.01); *H04N 7/155* (2013.01); *H04N 21/231* (2013.01)

(58) Field of Classification Search
CPC ........ H04M 3/56; H04N 7/155; H04N 21/231
(Continued)

(56) References Cited

U.S. PATENT DOCUMENTS 5,748,841 A * 5/1998 Morin ........................ G06F 3/16
704/E15.044
8,219,502 B2 * 7/2012 Gold ........................ G10L 15/26
705/320
(Continued)

FOREIGN PATENT DOCUMENTS

JP     2000-259389 A     9/2000
JP     2004-007561 A     1/2004
(Continued)

OTHER PUBLICATIONS

International Search Report with English Translation and Written Opinion of International Patent Application No. PCT/JP2022/041906 dated Jan. 24, 2023 (8 pages).

*Primary Examiner* — Binh Kien Tieu
(74) *Attorney, Agent, or Firm* — Foley & Lardner LLP

(57) ABSTRACT

In order to provide dialogue management means that allows prompt identification of portions of interest in a dialogue record even in a case where various subjects are discussed, provided is a dialogue management apparatus (210) including a dialogue interface section (212) that provides a dialogue interface for holding a digital dialogue between a plurality of speakers and acquires a dialogue record of the digital dialogue, a subject management section (214) that receives an input of subject designation information for designating a subject in the digital dialogue, while the digital dialogue is being held, and a dialogue editing section (216) that generates an edited dialogue record that is organized by (Continued)

200 subject, by editing the dialogue record in reference to the subject designation information.

9 Claims, 8 Drawing Sheets

(58) Field of Classification Search
USPC ....................................................... 348/14.08
See application file for complete search history.

(56) References Cited

U.S. PATENT DOCUMENTS

| | | | | |
|---|---|---|---|---|
| 11,663,397 | B1 * | 5/2023 | Stewart | G06F 40/166 |
| | | | | 704/9 |
| 2004/0114032 | A1 | 6/2004 | Kakii et al. | |
| 2008/0270905 | A1 * | 10/2008 | Goldman | G06F 9/453 |
| | | | | 715/721 |
| 2011/0289076 | A1 * | 11/2011 | Boyle | G06F 16/3329 |
| | | | | 707/723 |
| 2012/0278388 | A1 * | 11/2012 | Kleinbart | G06Q 10/06 |
| | | | | 709/204 |
| 2014/0236850 | A1 * | 8/2014 | Holland | G06Q 10/1053 |
| | | | | 705/321 |
| 2015/0264091 | A1 * | 9/2015 | Lin | H04L 67/12 |
| | | | | 709/228 |
| 2015/0278768 | A1 * | 10/2015 | Boring | G06F 3/0482 |
| | | | | 705/321 |
| 2018/0005191 | A1 * | 1/2018 | Metrewar | G06F 16/24578 |
| 2018/0351756 | A1 * | 12/2018 | Dave | H04N 21/4788 |
| 2019/0132265 | A1 | 5/2019 | Marcin et al. | |
| 2019/0164107 | A1 * | 5/2019 | Upadhyay | G06Q 10/06398 |
| 2021/0126890 | A1 * | 4/2021 | Weinhold | H04L 51/52 |
| 2021/0233030 | A1 * | 7/2021 | Preuss | G09B 7/00 |
| 2021/0295238 | A1 * | 9/2021 | Poon | G06Q 10/1053 |
| 2021/0334761 | A1 * | 10/2021 | Thombre | H04N 5/76 |
| 2023/0033257 | A1 * | 2/2023 | Shea | G06Q 10/1053 |
| 2023/0109692 | A1 * | 4/2023 | Dasgupta | G06Q 10/1053 |
| | | | | 705/321 |
| 2023/0214778 | A1 * | 7/2023 | McMahon | H04L 9/321 |

FOREIGN PATENT DOCUMENTS

| | | | | |
|---|---|---|---|---|
| JP | 2019-139572 | A | 8/2019 | |
| JP | 2021-117759 | A | 8/2021 | |
| JP | 2021-175155 | A | 11/2021 | |
| WO | WO-2021137848 | A1 * | 7/2021 | G06N 3/084 |

* cited by examiner

F I G . 3
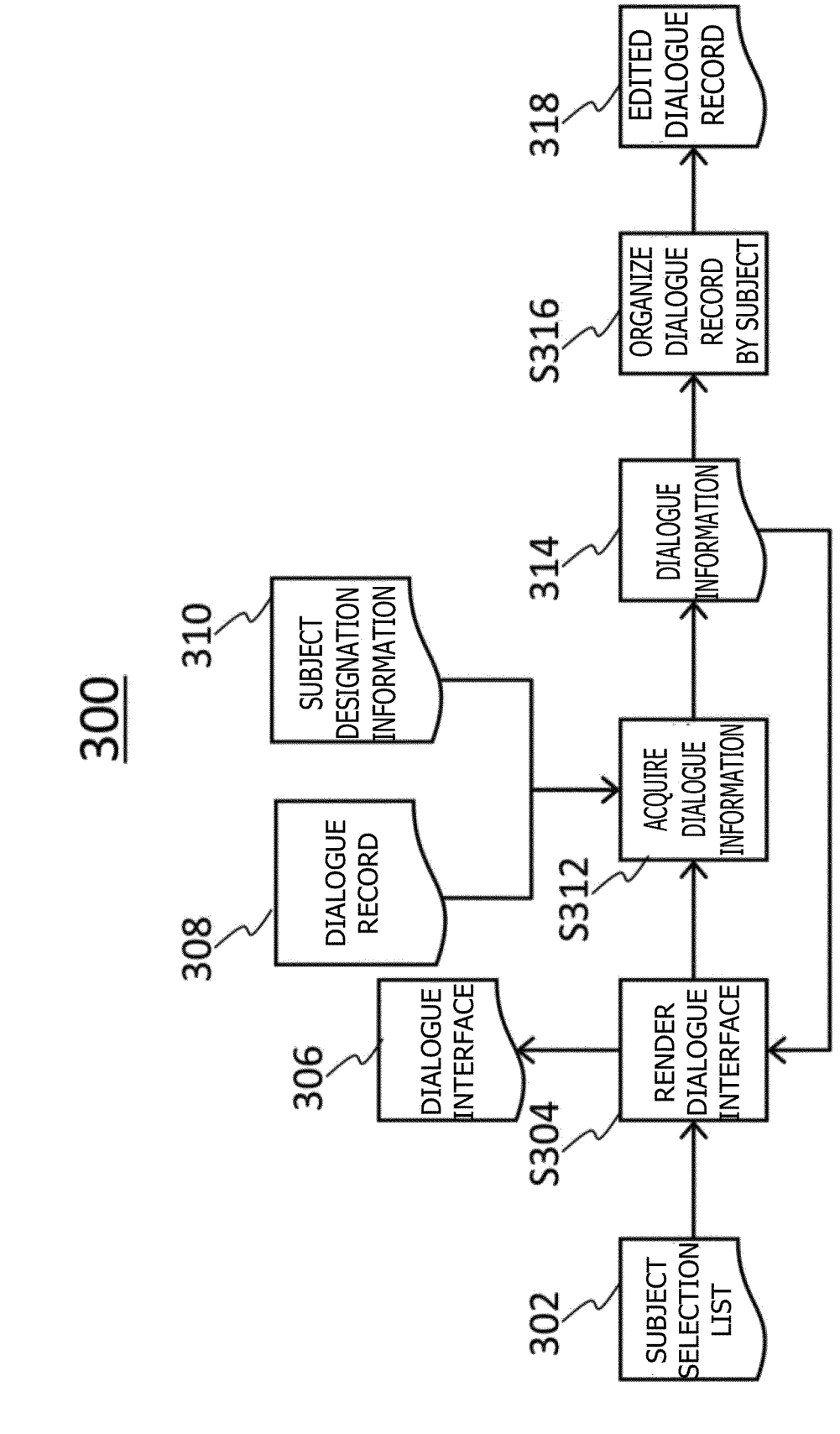

F I G . 5
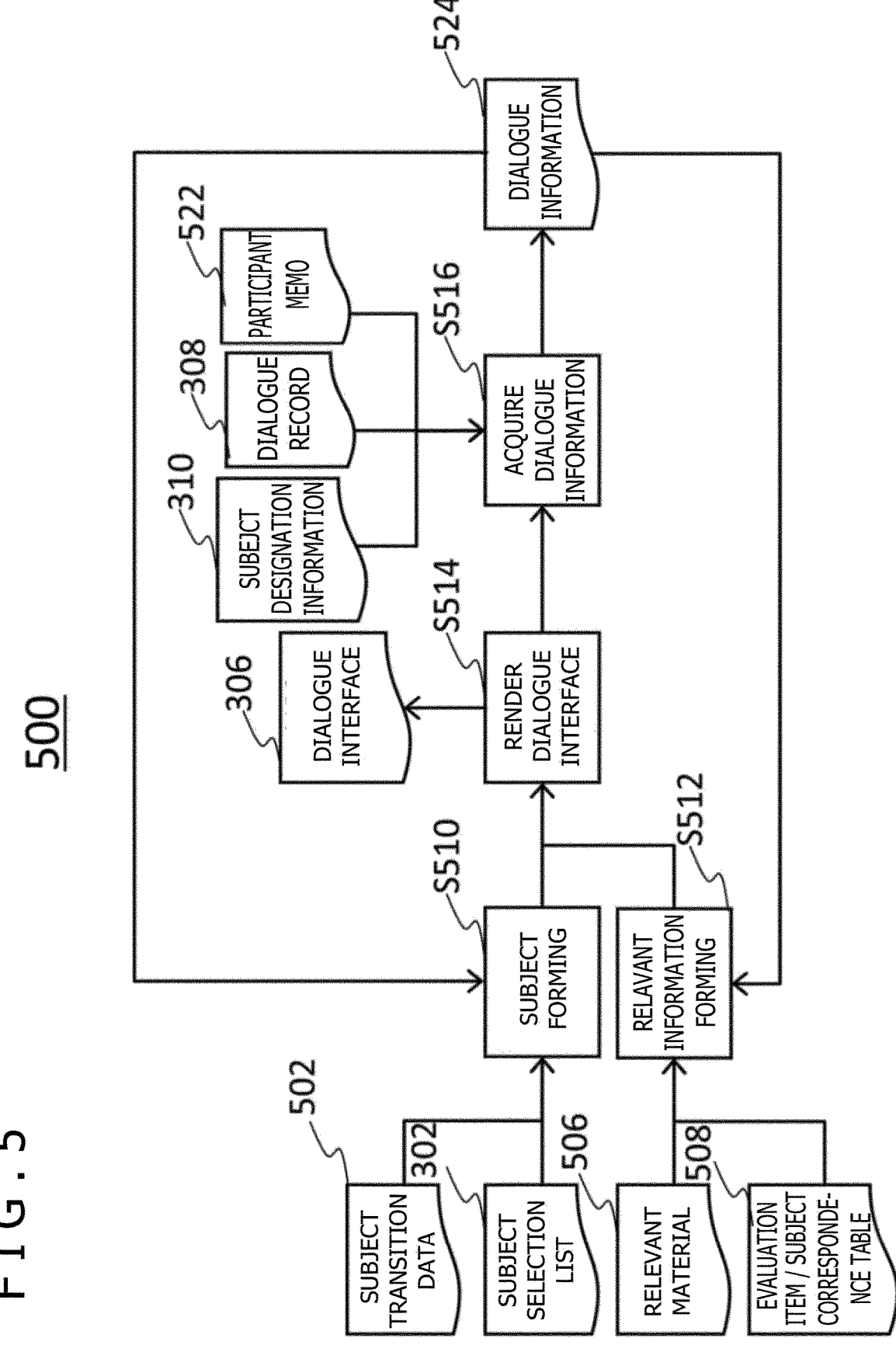

700

F I G . 8
800
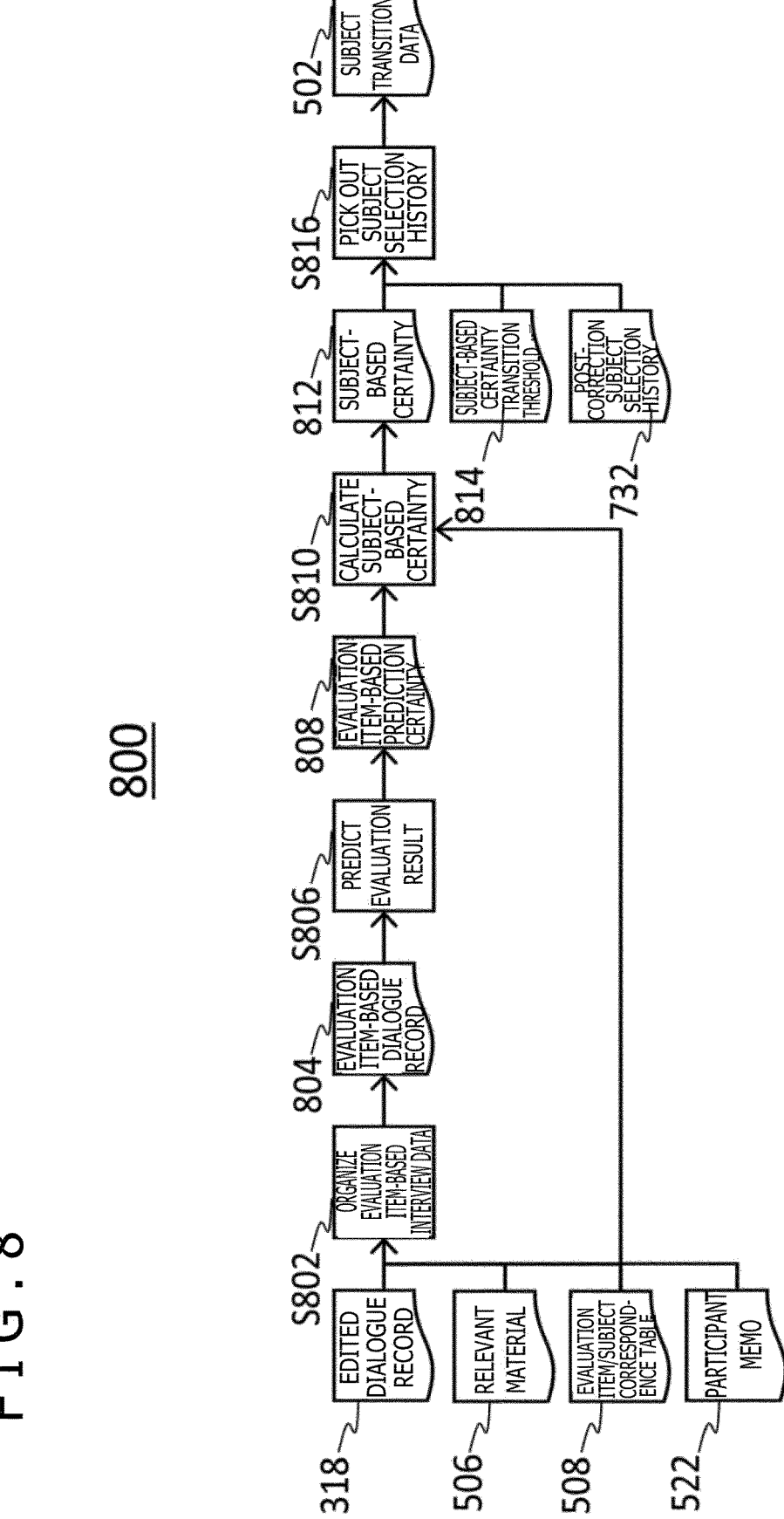

DIALOGUE MANAGEMENT APPARATUS, DIALOGUE MANAGEMENT SYSTEM, AND DIALOGUE MANAGEMENT METHOD

TECHNICAL FIELD

The present invention relates to a dialogue management apparatus, a dialogue management system, and a dialogue management method.

BACKGROUND ART

In recent years, meetings and interviews are held online via a communication network as exemplified by Internet connection. Especially, recent spread of remote working and the like have made it common practice for people to hold meetings and interviews online without meeting in person.

For such online meeting systems (online interview systems), various functions have been proposed. For example, there is known a function of recording a video of the meeting held on an online meeting system, storing the video, and then watching the video again after the meeting has ended.

There is a demand for prompt identification of the portions of interest to facilitate viewing when the recorded video of the meeting is to be watched again.

An example of a related technology concerning an online interview system includes, for example, JP-2021-175155-A (Patent Document 1).

Patent Document 1 discloses a technology in which "a mobile phone apparatus (smartphone 100) including an imaging section and a communication section is caused to function as an interview section. The communication section is configured to be capable of performing communication with another apparatus through a telephone network and the Internet. The interview section includes an interview control section. The interview control section transmits, to an interview partner, when the telephone number of the interview partner is input, connection information concerning live stream related to the interview, via the communication section and the telephone network. In a case where connection is established by the interview partner with use of the connection information, transmission/reception of audio in the live stream related to the interview with the interview partner held through the communication section and the telephone network is performed with use of a telephone section of the mobile phone apparatus. The interview control section controls transmission/reception of images in the live stream related to the interview with the interview partner, via the communication section and the Internet."

PRIOR ART DOCUMENT

Patent Document

Patent Document 1: JP-2021-175155-A

SUMMARY OF THE INVENTION

Problem to be Solved by the Invention

Patent Document 1 discloses means for determining the mood of the interview in reference to the contents of statements made by the participants of the interview and the like, by transcribing the contents of the call into text on the basis of recording data of the call made in the live stream related to the interview and analyzing the text data obtained as a result. In reference to the result of the analysis, the participants are able to alter their facial expressions, manner of speaking, their story, and the like in their next interview and hold the interview in a better mood.

Yet, Patent Document 1 includes no assumption of organizing, by subject, the records of dialogues held on phones or on online meeting systems. One possible way of acquiring a dialogue record that is arranged by subject is to record the dialogue by having the dialogue held by subject, but, in reality, in a dialogue held between a plurality of persons, it is often the case that one subject is abruptly changed to another subject or the original subject is discussed again after the other subject has been discussed; various subjects may be discussed. Hence, when one intends to organize the contents of a dialogue with use of the system, analyzing the subject may become difficult, or different subjects may be mixed. As a result, there occurs a challenge that prompt identification of the portions of interest becomes difficult at the time of viewing and listening to the dialogue record.

As such, an object of the present disclosure is to provide dialogue management means that allows prompt identification of the portions of interest in the dialogue record even in a case where various subjects are discussed.

Means for Solving the Problem

In order to solve the abovementioned challenge, a representative dialogue management apparatus according to the present invention includes a dialogue interface section that provides a dialogue interface for holding a digital dialogue between a plurality of speakers and acquires a dialogue record of the digital dialogue, a subject management section that receives an input of subject designation information for designating a subject in the digital dialogue, while the digital dialogue is being held, and a dialogue editing section that generates an edited dialogue record that is organized by subject, by editing the dialogue record in reference to the subject designation information.

Advantages of the Invention

The present disclosure can provide dialogue management means that allows prompt identification of the portions of interest in the dialogue record, even in a case where various subjects are discussed.

Challenges, configurations, and effects other than those described above will be made apparent from the description for the following embodiments of the invention.

BRIEF DESCRIPTION OF THE DRAWINGS

FIG. 3 is a diagram illustrating an example of a flow of a subject-based dialogue record generating process according to the embodiment of the present disclosure.

FIG. 5 is a diagram illustrating an example of a flow of a dialogue interface rendering process according to the embodiment of the present disclosure.

FIG. 8 is a diagram illustrating an example of a useful subject transition data registering process according to the embodiment of the present disclosure.

MODES FOR CARRYING OUT THE INVENTION

Figure 1:
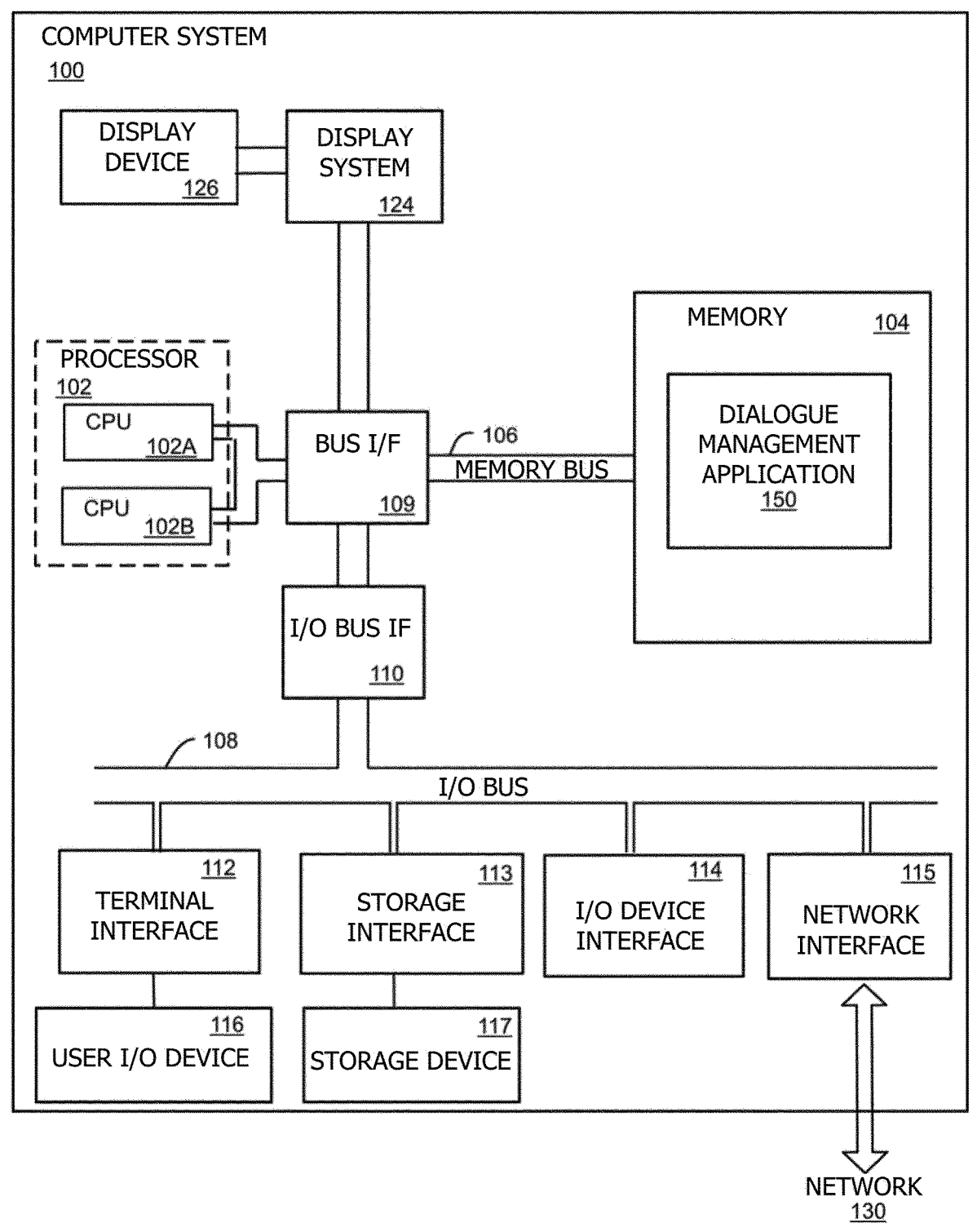
FIG. 1 is a diagram illustrating a computer system for implementing an embodiment of the present disclosure.

An embodiment of the present invention will hereinafter be described with reference to the drawings. Note that the present invention is by no means limited by the embodiment. Further, identical portions in the drawings are denoted by identical reference symbols.

As described above, there are demands for prompt identification of the portions of interest in the record of a dialogue held on phone or on an online meeting system.

As such, in the present disclosure, a menu (subject selection list) for selecting the current subject from candidates prepared in advance is displayed on an interface, and inputs designating a subject tag indicating the current subject and start time and end time for the current subject are received from participants of the dialogue, while the dialogue is being held. According to these inputs, a dialogue record that is labeled by subject can be obtained. Further, editing the dialogue record labeled by subject and organizing the portions (dialogue recorded portions) corresponding to the same subject make it possible to generate an edited dialogue record that is organized by subject.

As a result, even in a case where various subjects are discussed, prompt identification of the portions of interest in the dialogue record is possible.

First, with reference to FIG. 1, a computer system 100 for implementing the embodiment of the present disclosure will be described. Mechanisms and apparatuses of various embodiments disclosed in the present specification may be applied to any appropriate computing system. Main components of the computer system 100 include one or more processors 102, a memory 104, a terminal interface 112, a storage interface 113, an I/O (input/output) device interface 114, and a network interface 115. These components may mutually be connected to each other via a memory bus 106, an I/O bus 108, a bus interface unit 109, and an I/O bus interface unit 110.

The computer system 100 may include one or a plurality of general-purpose programmable central processing units (CPUs) 102A and 102B that are collectively referred to as the processor 102. In one embodiment, the computer system 100 may include a plurality of processors, while in another embodiment, the computer system 100 may be a single CPU system. Each processor 102 executes commands stored in the memory 104 and may include an on-board cache.

In one embodiment, the memory 104 may include a random access semiconductor memory, a storage device, or a storage medium (either volatile or non-volatile) for storing data and programs. The memory 104 may store all or part of the programs, modules, and data structures that implement the functions described in the present specification. For example, the memory 104 may store a dialogue management application 150. In one embodiment, the dialogue management application 150 may include commands or descriptions for executing the functions described later on the processor 102.

In one embodiment, the dialogue management application 150 may be implemented, in place of or in addition to a processor-based system, in hardware through a semiconductor device, a chip, a logical gate, a circuit, a circuit card, and/or another physical hardware device. In one embodiment, the dialogue management application 150 may include data other than commands or descriptions. In one embodiment, a camera, a sensor, or any other data input device (not illustrated) may be provided to directly communicate with the bus interface unit 109, the processor 102, or any other hardware of the computer system 100.

The computer system 100 may include the bus interface unit 109 that implements communication between the processor 102, the memory 104, a display system 124, and the I/O bus interface unit 110. The I/O bus interface unit 110 may be connected to the I/O bus 108 for transferring data between various I/O units. The I/O bus interface unit 110 may communicate with a plurality of I/O interface units 112, 113, 114, and 115 that are known as I/O processors (IOPs) or I/O adapters (IOAs), via the I/O bus 108.

The display system 124 may include a display controller, a display memory, or both of them. The display controller is capable of providing data concerning video, audio, or both of them to a display device 126. Further, the computer system 100 may include one or a plurality of devices such as sensors that are configured to collect data and provide the data to the processor 102.

For example, the computer system 100 may include a biometric sensor that collects heart rate data, stress level data, and the like, an environment sensor that collects humidity data, temperature data, pressure data, and the like, and a motion sensor that collects acceleration data, motion data, and the like. Other types of sensors can also be used. The display system 124 may be connected to the display device 126 such as an independent display screen, a television set, a tablet, or a mobile device.

An I/O interface unit has a function of communicating with various storages or I/O devices. For example, to the terminal interface unit 112, there can be attached a user I/O device 116 as exemplified by a user output device such as a video display device, a speaker, or a television or a user input device such as a keyboard, a mouse, a keypad, a touch pad, a trackball, a button, a writing pen, or other pointing devices. The user uses the user interface and operates the user input device to input input data or instructions to the user I/O device 116 and the computer system 100 or receive output data from the computer system 100. The user interface may, for example, be displayed on a display device, reproduced through a speaker, or printed by a printing machine, via the user I/O device 116.

To the storage interface 113, there can be attached one or a plurality of disk drives or a direct access storage device 117 (normally, this is a magnetic disk drive storage device, but may instead be an array of disk drives configured to be regarded as a single disk drive or another storage device). In one embodiment, the storage device 117 may be implemented as any secondary storage device. The contents stored in the memory 104 may be stored in the storage device 117 and read out from the storage device 117 as needed. The I/O device interface 114 may provide an interface for other I/O devices such as a printing machine and a fax machine. The network interface 115 may provide a communication path to allow mutual communication between the computer system 100 and other devices. This communication path may, for example, be a network 130.

In one embodiment, the computer system 100 may be a device that receives a request from another computer system (client) and that has no direct user interface such as a multi-user main frame computer system, a single user system, or a server computer. In another embodiment, the computer system 100 may be a desktop computer, a mobile computer, a laptop PC, a tablet computer, a pocket-type computer, a phone, a smartphone, or any other appropriate electronic device.

Next, a dialogue management system according to the embodiment of the present disclosure will be described with reference to FIG. 2.

Figure 2:
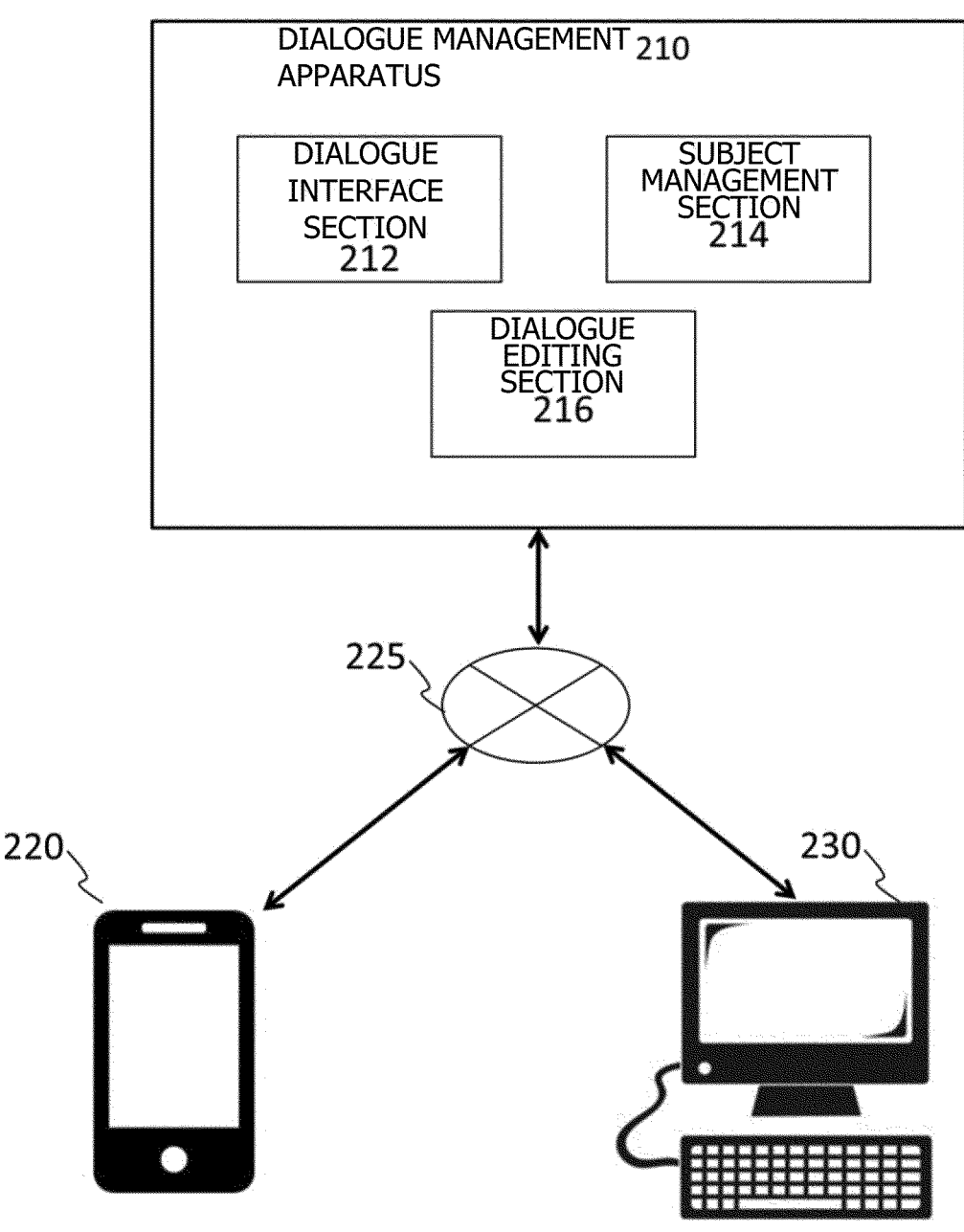
FIG. 2 is a diagram illustrating an example of a configuration of a dialogue management system according to the embodiment of the present disclosure.

FIG. 2 is a diagram illustrating an example of a configuration of a dialogue management system 200 according to the embodiment of the present disclosure. The dialogue management system 200 according to the embodiment of the present disclosure is a system for generating an edited dialogue record that is organized by subject with respect to a digital dialogue held between a plurality of persons. As illustrated in FIG. 2, the dialogue management system 200 mainly includes a dialogue management apparatus 210, a first dialogue apparatus 220, and a second dialogue apparatus 230. The dialogue management apparatus 210, the first dialogue apparatus 220, and the second dialogue apparatus 230 are connected to one another in a manner allowing communication therebetween via a communication network 225 such as the Internet, for example.

The dialogue management apparatus 210 is an apparatus used to provide a platform for holding a digital dialogue between the first dialogue apparatus 220 and the second dialogue apparatus 230 and generate an edited dialogue record that is organized by subject with regard to the digital dialogue held. Here, a digital dialogue refers to information sharing performed with use of words between at least two speakers via a telephone, an online meeting system, or an application, for example. The digital dialogue referred to here may be held only by sharing audio information as on phone calls or may be held by sharing both audio information and image information as in video calls, for example.

Further, the "speaker" used here means a person who participates in the digital dialogue. In the following description, a digital dialogue held between two speakers (first speaker and second speaker) is explained as one example for the sake of description, but the present disclosure is not limited to this, and a digital dialogue may be held between any number of persons.

As illustrated in FIG. 2, the dialogue management apparatus 210 includes a dialogue interface section 212, a subject management section 214, and a dialogue editing section 216.

The dialogue interface section 212 provides a dialogue interface for holding a digital dialogue between the first speaker and the second speaker and is a functional section that acquires a dialogue record of the digital dialogue held. Here, the dialogue interface is displayed on displays of the first dialogue apparatus 220 and the second dialogue apparatus 230 that are described later, for example, and refers to a GUI (Graphical User Interface) screen that provides information and setting related to the dialogue. As one example, the dialogue interface may include images of the speakers acquired by a camera, a text chat window, setting items of the camera and a microphone, and other relevant items, for example. Moreover, as described later, the dialogue interface according to the embodiment of the present disclosure may display a menu for selecting the current subject from candidates prepared beforehand and relevant materials related to the current subject.

The subject management section 214 is a functional section that receives an input of subject designation information for designating the subject in the digital dialogue, while the digital dialogue is being held. More specifically, the subject management section 214 may display a subject selection list including a plurality of subject candidates on the dialogue interface generated by the dialogue management apparatus 210 and receive, as the subject designation information, a first subject tag selected from the subject selection list, first start time for the first subject, and first end time for the first subject, according to the input made by a speaker (for example, an interviewer).

Thereafter, the subject management section 214 may associate the first subject tag with a first dialogue recorded portion corresponding to the first start time for the first subject and the first end time for the first subject that have been received. The subject management section 214 receives inputs of subject designation information from the speakers and associates the designated subject tag with the designated dialogue recorded portion, until the digital dialogue is ended, to thereby acquire a dialogue record that is labeled by subject. The dialogue recorded portion here means a portion of the dialogue record.

The dialogue editing section 216 is a functional section that generates an edited dialogue record that is organized by subject, by editing the dialogue record recorded by the dialogue management apparatus 210 in reference to the subject designation information acquired by the subject management section 214, after the digital dialogue is ended. More specifically, the dialogue editing section 216 may generate the edited dialogue record that is organized by subject, by extracting the dialogue recorded portions associated with the same subject tag (for example, the first subject tag) from the dialogue record labeled by subject and organizing the extracted dialogue recorded portions.

Here, the expression of "extracting the dialogue recorded portions [ . . . ] and organizing the extracted dialogue recorded portions" refers to an act of clipping the dialogue recorded portions corresponding to the respective subject tags from the dialogue record with use of existing video or audio editing means, and combining the dialogue recorded portions corresponding to the same subject tag as one group, for example. The dialogue recorded portions in each group may be arranged in the order of time or may be arranged according to the predetermined order of priority for subjects.

Note that the outline and main functions of the functional sections included in the dialogue management apparatus 210 have been explained in the above description, but the present disclosure is not limited to this. As described later, the dialogue management apparatus 210 may include other functions.

Further, the term "section" used in the present embodiment may include, for example, those obtained by combining hardware resources implemented by circuits in a broad sense and information processing performed by software (for example, the dialogue management application 150 illustrated in FIG. 1) that may specifically be implemented by these hardware resources. Further, while various kinds of information are handled in the present embodiment, these kinds of information may be represented by a physical value of a signal value representing a voltage or a current, level of the signal value as a bit aggregate of a binary number configured by 0 or 1, or quantum superposition (what is generally called a quantum bit), and communication and arithmetic operation may be executed on a circuit in a broad sense.

The first dialogue apparatus 220 and the second dialogue apparatus 230 are each a terminal used by a speaker participating in a digital dialogue and connect to the digital dialogue platform provided by the dialogue management apparatus 210 via the communication network 225. The first dialogue apparatus 220 and the second dialogue apparatus 230 are each a terminal that has the function of acquiring and providing audio information and/or image information that is transmitted and received in a digital dialogue and may be a smartphone, a tablet, a PC, or the like, for example. More specifically, the first dialogue apparatus 220 and the second dialogue apparatus 230 may each be configured to display, on a screen, the dialogue interface generated by the dialogue interface section 212, and to receive an input of information (for example, an input of subject designation information) made by the user. Note that, in FIG. 2, for the sake of description, a configuration of the dialogue management system 200 including two dialogue apparatuses is illustrated as an example, but in practice, the number of dialogue apparatuses may be decided according to the number of speakers participating in the digital dialogue.

According to the dialogue management system 200 configured as described above, generating an edited dialogue record that is organized by subject makes it possible to promptly identify the portions of interest in the dialogue record even in a case where various subjects are discussed.

Note that, in FIG. 2, the dialogue management apparatus 210 has been explained as one in which the functions of the dialogue interface section 212, the subject management section 214, and the dialogue editing section 216 are implemented in the dialogue management apparatus 210 that can be accessed via the communication network 225, as one example, but the present disclosure is not limited to this. For example, also possible is a configuration in which the dialogue interface section 212, the subject management section 214, and the dialogue editing section 216 are implemented by software operating on the first dialogue apparatus 220 and the second dialogue apparatus 230.

Next, the process for generating a dialogue record for each subject (hereinafter sometimes referred to as the "subject-based dialogue record generating process") according to the embodiment of the present disclosure will be described with reference to FIG. 3.

FIG. 3 is a diagram illustrating an example of a flow of a subject-based dialogue record generating process 300 according to the embodiment of the present disclosure. The subject-based dialogue record generating process 300 illustrated in FIG. 3 is a process for generating an edited dialogue record that is organized by subject, and is implemented by the dialogue interface section 212, the subject management section 214, and the dialogue editing section 216 that are included in the dialogue management apparatus 210 described above.

First, in step S304, the dialogue interface section 212 acquires information concerning a subject selection list 320 and renders a dialogue interface 306 including the acquired subject selection list 302. The subject selection list 302 is information including a plurality of subject candidates and may be created in advance by the digital dialogue host, for example, before the digital dialogue is held. Subject candidates to be included in the subject selection list 302 may be prepared in reference to information regarding the topic that is to be discussed in a specific digital dialogue, for example. As one example, in a case where the digital dialogue is to be held as a recruitment interview of a company, the subject selection list 302 may include, for example, "socializing in previous employment" and "projects handled in previous employment."

Here, the dialogue interface section 212 may generate the dialogue interface 306 including, in addition to images of speakers, text chat windows, and setting items of the camera and the microphone, the acquired subject selection list 302. As described above, the dialogue interface 306 may be displayed on the dialogue apparatuses (first dialogue apparatus 220 and second dialogue apparatus 230) of the speakers participating in the digital dialogue.

Next, in step S312, the dialogue interface section 212 acquires a dialogue record 308, and the subject management section 214 acquires subject designation information 310. Here, the set of pieces of information including the dialogue record 308 and the subject designation information 310 is collectively referred to as "dialogue information 314."

The dialogue record 308 is information in which the digital dialogue is recorded, and may include audio information, image information, or both of them. For example, in a case where the digital dialogue is held on a phone call, the dialogue record 308 may be a record in which audio information acquired from the speaker who participated in the digital dialogue is recorded, and in a case where the digital dialogue is held in a video call, the dialogue record 308 may be a record in which audio information and image information acquired from the speaker who participated in the digital dialogue are recorded.

The subject designation information 310 is information including the first subject tag selected from the subject selection list 302 that is displayed on the dialogue interface 306, the first start time for the first subject, and the first end time for the first subject.

Here, the subject management section 214 may receive, as the subject designation information, the first subject tag selected from the subject selection list 302, the first start time for the first subject, and the first end time for the first subject, according to the input made by the speaker (for example, the interviewer) with respect to the subject selection list 302. Thereafter, the subject management section 214 may associate the first subject tag with the first dialogue recorded portion corresponding to the first start time for the first subject and the first end time for the first subject that have been received. By receiving inputs of subject designation information from the speakers and associating the designated subject tag with the designated dialogue recorded portion until the digital dialogue is ended, the subject management section 214 can obtain a dialogue record that is labeled by subject.

Note that, in the present disclosure, the aggregate of all pieces of subject designation information acquired from a specific speaker during the digital dialogue is called a "subject selection history."

Next, in step S316, the dialogue editing section 216 generates an edited dialogue record that is organized by subject, in reference to the dialogue information acquired in step S312. After the digital dialogue is ended, the dialogue editing section 216 generates an edited dialogue record that is organized by subject, by editing the dialogue record 308 in reference to the subject designation information 310. More specifically, the dialogue editing section 216 may generate an edited dialogue record that is organized by subject, by extracting the dialogue recorded portions that are associated with the same subject tag (for example, the first subject tag) from the dialogue record that is labeled by subject and organizing the extracted dialogue recorded portions.

According to the subject-based dialogue record generating process 300 described above, an edited dialogue record that is organized by subject can be generated, so that, even in a case where various subjects are discussed, portions of interest can promptly be identified in the dialogue record.

The dialogue interface and the edited dialogue record according to the embodiment of the present disclosure will next be explained with reference to FIG. 4.

Figure 4:
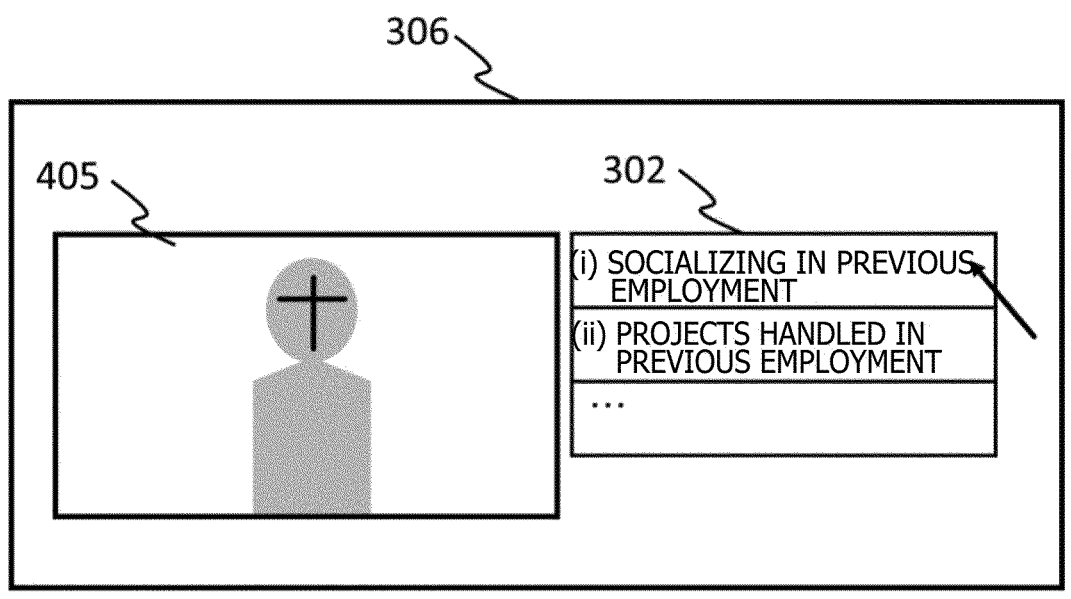
FIG. 4 is a diagram illustrating an example of a dialogue interface and subject-based dialogue recorded portions according to the embodiment of the present disclosure.
Figure 4:
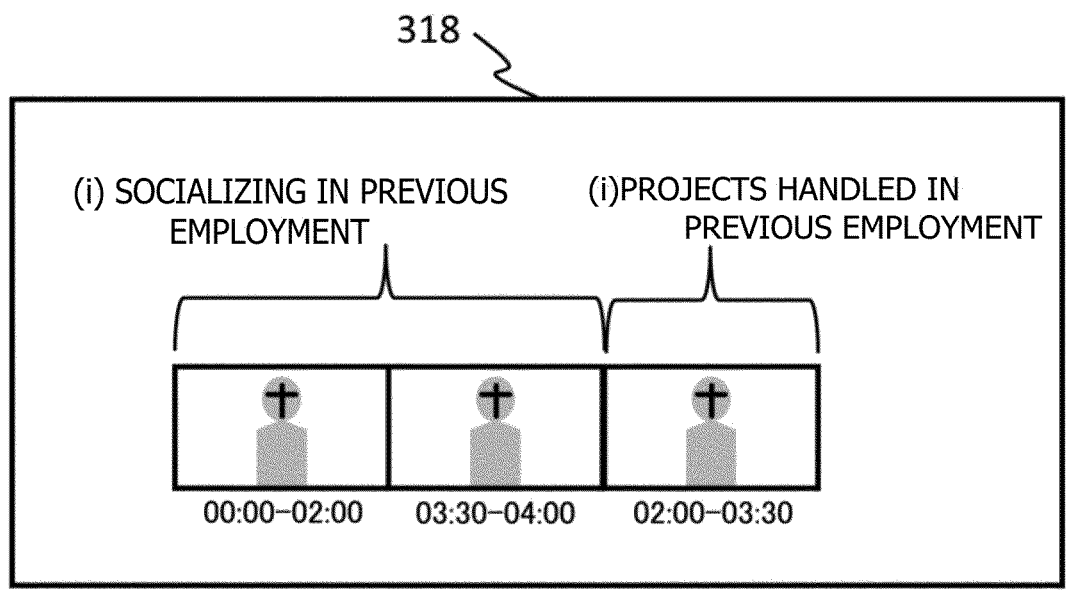

FIG. 4 is a diagram illustrating an example of the dialogue interface 306 and an edited dialogue record 318 according to the embodiment of the present disclosure.

As illustrated in FIG. 4, on the dialogue interface 306, an image 405 of the partner of the digital dialogue and the abovementioned subject selection list 302 are displayed. In addition, the subject selection list 302 includes subject tags of subject candidates such as "socializing in previous employment" and "projects handled in previous employment." The speaker (for example, the first speaker) who is participating in the digital dialogue with use of the dialogue interface 306 may select a subject tag (first subject tag) corresponding to the current subject (first subject) while the digital dialogue is ongoing in real time. This allows the selected first subject tag to be associated with the current time (first start time for the first subject) in the dialogue record.

Further, as the digital dialogue proceeds, every time the subject changes, the speaker may select a new subject tag (second subject tag) from the subject selection list 302. Following this, the selected second subject tag is associated with the current time (the first end time for the first subject and the first start time for the second subject) in the dialogue record, and the first subject is assumed to have ended.

Receiving inputs of subject designation information from speakers and associating the designated subject tag with the designated dialogue recorded portion until the digital dialogue is ended make it possible to obtain a dialogue record that is labeled by subject.

Further, after the digital dialogue is ended, the dialogue editing section 216 may generate the edited dialogue record 318 that is organized by subject as illustrated in FIG. 4, by extracting the dialogue recorded portions that are associated with the same subject tag (for example, the first subject tag or the second subject tag) from the dialogue record that is labeled by subject and organizing the extracted dialogue recorded portions.

For example, assume a case in which, in the dialogue record, the first subject tag of "socializing in previous employment" is associated with the first dialogue recorded portion corresponding to the time period from 00:00 to 02:00 and the third dialogue recorded portion corresponding to the time period from 03:30 to 04:00 and the second subject tag of "projects handled in previous employment" is associated with the second dialogue recorded portion corresponding to the time period from 02:00 to 03:30. In this case, by editing the dialogue record, the dialogue editing section 216 may connect and arrange in time order the first dialogue recorded portion and the third dialogue recorded portion that are associated with the first subject tag and then connect the second dialogue recorded portion associated with the second subject tag to the rear of the third dialogue recorded portion, to thereby generate the edited dialogue record 318 that is organized by subject.

Note that the order of subjects in the dialogue record 318 may be the order of being discussed in the digital dialogue or the order based on the order of priority decided in advance, for example.

Next, the dialogue interface rendering process according to the embodiment of the present disclosure will be explained with reference to FIG. 5.

FIG. 5 is a diagram illustrating an example of a flow of a dialogue interface rendering process 500 according to the embodiment of the present disclosure. The dialogue interface rendering process 500 illustrated in FIG. 5 is a process for generating a dialogue interface including the subject selection list 302, an image of the dialogue partner, and the like, and is performed by the dialogue interface section 212 and the subject management section 214 included in the dialogue management apparatus 210 described above.

As described above, in one mode of the present disclosure, while the dialogue is being held, the subject selection list 302 for selecting the current subject from the candidates prepared in advance is displayed on the dialogue interface 306, and an input of subject designation information designating the subject tag indicating the current subject and the start time and the end time for the current subject is received from the participant of the dialogue.

However, if many subject candidates are displayed in the subject selection list 302 at the time when the subject designation information is to be input, searching for and selecting the desired subject may require effort. Thus, one mode of the dialogue interface rendering process 500 according to the embodiment of the present disclosure relates to a subject forming process for displaying, in a highlighted manner, the subject candidates with high relevance to the current subject in the subject selection list 302. This saves the effort of searching for and selecting the desired subject and allows the participants of the dialogue who input subject designation information to easily select the subject candidates with high relevance to the current subject.

Further, at the time of holding a dialogue, a speaker who participates in the dialogue may intend to evaluate or analyze specific contents in the dialogue. One possible example is a case in which the dialogue is held as a recruitment interview at a company, where the interviewer who is a speaker that participates in the dialogue intends to evaluate predetermined evaluation items with respect to the candidate's aptitude and ability. Accordingly, another mode of the dialogue interface rendering process 500 relates to displaying, on the dialogue interface 306, relevant materials (for example, evaluation criteria for respective evaluation items, etc.) with high relevance to the current subject. This allows the participants of the dialogue to easily check materials with high relevance while having a dialogue.

First, in step S510, the subject management section 214 performs the subject forming process of inputting subject transition data 502 and the subject selection list 302 and displaying, in a highlighted manner in the subject selection list 302, the subject candidates with high relevance to the current subject, in reference to the inputted subject transition data 502 and subject selection list 302. Further, here, the subject management section 214 may input the dialogue information 524 acquired in the past, in addition to the abovementioned input information.

The subject transition data 502 here is information concerning transition from one subject (first subject) to another subject (second subject) and, for example, may include a dialogue ID for identifying the current subject, a transition ID for identifying the transition, a subject ID for identifying each subject, dialogue contents indicating the contents of the dialogue (also referred to as "verification text information" in the present disclosure), pre-correction subject start time (first start time for the first subject), pre-correction subject end time (first end time for the first subject), post-correction subject start time (second start time for the first subject), and post-correction subject end time (second end time for the first subject).

Description of the subject selection list 302, which has been given above, will be omitted here.

Note that the details of the subject forming process for displaying, in a highlighted manner, the subject candidates with high relevance to the current subject in the subject selection list 302 are described later, and are thus omitted here.

In step S512, the subject management section 214 performs a relevant information forming process of inputting a relevant material 506 and an evaluation item/subject correspondence table 508 and displaying relevant materials with high relevance to the current subject on the dialogue interface 306, in reference to the inputted relevant material 506 and evaluation item/subject correspondence table 508.

Further, here, the subject management section 214 may input the dialogue information 524 acquired in the past, in addition to the abovementioned input information.

The relevant material 506 here is a material that is prepared before the digital dialogue is held and that is related to the digital dialogue. The relevant material 506 may be a presentation material or a reference material that is related to the topic in the digital dialogue, for example. As one example, in a case where the digital dialogue is held as a recruitment interview, the relevant material 506 may include an answer to a survey performed for the candidate, a job resume of the candidate, and the like.

The evaluation item/subject correspondence table 508 is information in a table format indicating the corresponding relation between the subject and the evaluation item. As one example, in a case where the digital dialogue is held as a recruitment interview, the evaluation item/subject correspondence table 508 may indicate that the subject of "projects handled in previous employment" corresponds to the evaluation item of "work experience."

Note that the details of the relevant information forming process for displaying relevant materials with high relevance to the current subject on the dialogue interface 306 are described later and thus will be omitted here.

Next, in step S514, the dialogue interface section 212 renders the dialogue interface 306 in reference to the information acquired in the subject forming process in step S510 and the relevant information forming process in step S512.

As described above, here, the dialogue interface section 212 may generate the dialogue interface 306 including, in addition to the images of speakers, text chat windows, setting items of the camera and the microphone, and the like, the subject selection list 302 in which the subject candidates with high relevance to the current subject are displayed in a highlighted manner and the relevant information with high relevance to the current subject. The dialogue interface 306 may be displayed on the dialogue apparatus(es) (first dialogue apparatus 220 and/or second dialogue apparatus 230) of the speaker(s) participating in the digital dialogue.

Next, in step S516, the dialogue interface section 212 acquires the dialogue record 308 and a participant memo 522, and the subject management section 214 acquires the subject designation information 310. Here, the set of pieces of information including the dialogue record 308, the participant memo 522, and the subject designation information 310 is collectively referred to as the "dialogue information" 524.

As described above, the dialogue record 308 is information in which a digital dialogue is recorded, and may include audio information, image information, or both of them.

Further, as described above, the subject designation information 310 is information including the first subject tag selected from the subject selection list 302 that is displayed on the dialogue interface 306, the first start time for the first subject, and the first end time for the first subject.

The participant memo 522 is a note input by the speaker participating in the digital dialogue on the dialogue interface 306. Information concerning the participant memo 522 may be recorded for each subject.

The dialogue information 524 acquired here is fed back to the subject forming process in step S510 and the relevant information forming process in step S512. As described above, the subject forming process and the relevant information forming process that are subsequently performed use the dialogue information 524 and can thus provide the result of subject forming and the result of relevant information forming that have higher accuracy.

Next, the subject forming process and the relevant information forming process according to the embodiment of the present disclosure will be described with reference to FIG. 6.

Figure 6:
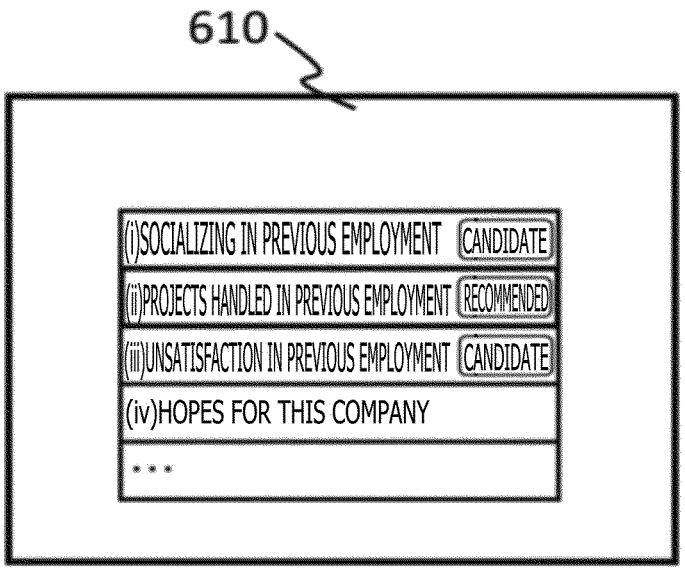
FIG. 6 is a diagram for explaining a subject forming process and a relevant information forming process according to the embodiment of the present disclosure.
Figure 6:
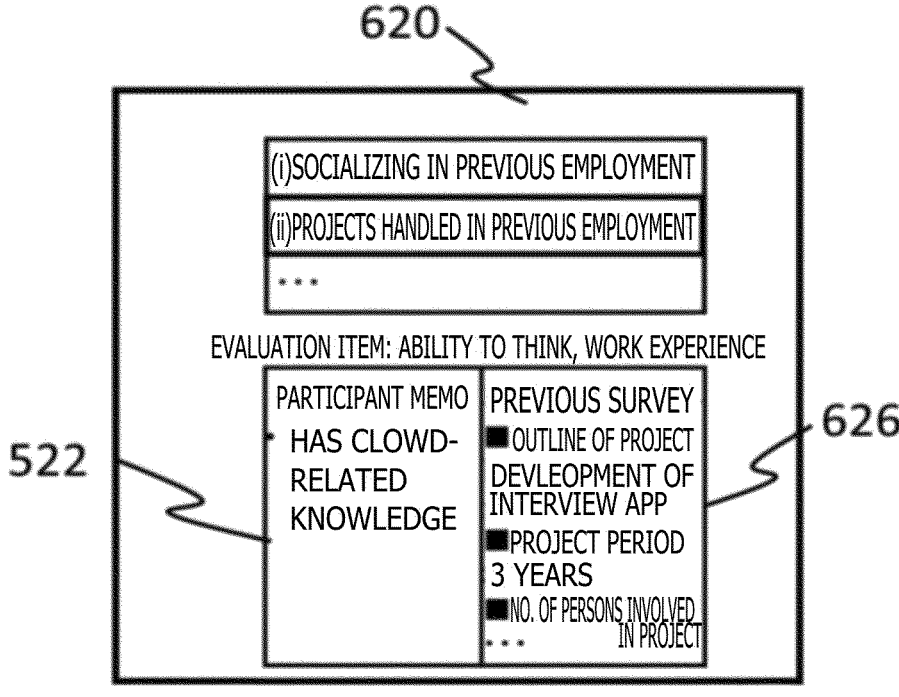

FIG. 6 is a diagram explaining the subject forming process and the relevant information forming process according to the embodiment of the present disclosure. Illustrated in FIG. 6 are one example of a dialogue interface 610 prepared by the subject forming process and one example of a dialogue interface 620 prepared by the relevant information forming process.

As described above, the subject forming process is a process for displaying, in a highlighted manner, the subject candidates with high relevance to the current subject in the subject selection list 302, and is performed by the subject management section 214.

Here, the dialogue interface section 212 acquires a first speech (for example, a statement made within the last 10 seconds) that satisfies a predetermined criterion of closeness (for example, a criterion designating a predetermined period prior to the current point in time) and converts this first speech into text information, to thereby generate first speech text information. This first speech may be a statement made by any of the speakers participating in the digital dialogue. Further, in order to convert this first speech into text information, existing automatic speech recognition means may be used.

Next, the subject management section 214 determines the degree of relevance between the first speech text information and each subject candidate included in the subject selection list 302. Here, either of the following two methods can be used as the method for determining the degree of relevance.

In the first method for determining the degree of relevance, the subject management section 214 searches for the subject transition data corresponding to the current subject transition, from among the pieces of subject transition data collected beforehand. Thereafter, the subject management section 214 compares the first speech text information with the verification text information that is included in the subject transition data searched for and that is associated with each of the subject candidates included in the subject selection list 302, to thereby calculate the degree of relevance of the first speech to each of the plurality of subject candidates, according to the number of words matching. The verification text information here is text information which is determined to be highly relevant to a specific subject candidate, predicted highly likely to come up in discussing the subject, and prepared beforehand, and further is information that is included in the subject transition data described above.

Further, here, the degree of relevance between the first speech text information and each of the subject candidates included in the subject selection list 302 may be determined with use of the degree of similarity in semantic information determined by a natural language process, other than the number of words matching.

Further, in the second method for determining the degree of relevance, the subject management section 214 may search for the subject transition data that corresponds to the current subject transition, from among the pieces of subject transition data collected beforehand, and output, as the subject candidate with high relevance, the subject candidate corresponding to the next transition destination that is designated by the subject transition data searched for.

As described above, the relevance between the contents of the current dialogue and the subject candidates can be determined in reference to the first speech text information and the subject transition data.

Next, the subject management section 214 determines the subject candidate whose degree of relevance to the first speech satisfies a predetermined relevance criterion (for example, the candidate with the highest relevance), and the dialogue interface section 212 displays, in a highlighted manner, the determined subject candidate in the subject selection list 302.

As illustrated in FIG. 6, the dialogue interface section 212 may display the subject candidates whose degree of relevance to the first speech satisfies a predetermined relevance criterion, in high positions, in a highlighted manner with colors changed, or in a highlighted manner with character tags such as "recommended" added, on the dialogue interface 610 created by the subject forming process; the method of displaying in a highlighted manner is not particularly limited to any method. Further, as illustrated in the dialogue interface 610, the dialogue interface section 212 may display character tags such as "candidate" for other subject candidates that have a certain degree of relevance to the first speech.

Further, as described above, the relevant information forming process is a process for displaying the relevant materials with high relevance to the current subject on the dialogue interface and is performed by the subject management section 214.

Here, the subject management section 214 may, as in the subject forming process, acquire a second speech (for example, a statement made within the last 10 seconds) that satisfies a predetermined criterion of closeness (for example, a criterion designating a predetermined period prior to the current point in time) and convert the second speech into text information, to thereby generate second speech text information. The second speech may be a statement made by any of the speakers participating in the digital dialogue. Further, existing automatic speech recognition means may be used to convert this second speech into text information.

Next, the subject management section 214 compares the second speech text information with the relevant material related to the current digital dialogue, and calculates the degree of relevance of the second speech to each of the items included in the relevant material. Here, in order to calculate the degree of relevance of the second speech to each of the plurality of items included in the relevant material, the dialogue interface section 212 may calculate the degree of relevance according to the number of words matching with the second speech text information or calculate the degree of relevance in reference to the degree of similarity in semantic information obtained by a natural language process, for each item included in the relevant material.

Next, the subject management section 214 determines the item which is included in the relevant material and whose degree of relevance to the second speech satisfies a predetermined relevance criterion (for example, the item with the highest degree of relevance), and the dialogue interface section 212 displays the determined item on the dialogue interface 306.

As illustrated in FIG. 6, the dialogue interface section 212 may display an answer to a survey conducted in advance, as an item 626 which is included in the relevant material and whose degree of relevance to the second speech satisfies a predetermined relevance criterion, on the dialogue interface 620 that has been created by the relevant information forming process. Further, the dialogue interface section 212 may display a window to be used for input of the participant memo 552 that has been input by a speaker participating in the digital dialogue, on the dialogue interface 620.

Further, in one mode of the present disclosure, in a case where pieces of information concerning the item 626 of the relevant material that are to be displayed cannot all be displayed on the dialogue interface 620, the dialogue interface section 212 may automatically scroll the item 626 of the relevant material, according to the contents of the current subject discussed in the digital dialogue. Here, the dialogue interface section 212 may convert the statements made within the predetermined period of time prior to the current point in time, and scroll the item 626 such that the item 626 of the relevant material which has the most number of words matching the text information is located at an easily visible position, as described above.

According to the subject forming process described above, even in a case where many subject candidates are to be displayed in the subject selection list 302, at the time of inputting the subject designation information, the subject candidate with high relevance to the current subject can be displayed in a highlighted manner in the subject selection list 302. This saves the effort of searching for and selecting the desired subject and allows the participants of the dialogue who input the subject designation information to easily select the subject candidate with high relevance to the current subject.

Further, according to the relevant information forming process described above, the relevant material with high relevance to the current subject can be displayed on the dialogue interface 306. This allows the participants of the dialogue to easily check the material with high relevance while holding a dialogue.

Next, the dialogue record timing correction process according to the embodiment of the present disclosure will be explained with reference to FIG. 7.

Figure 7:
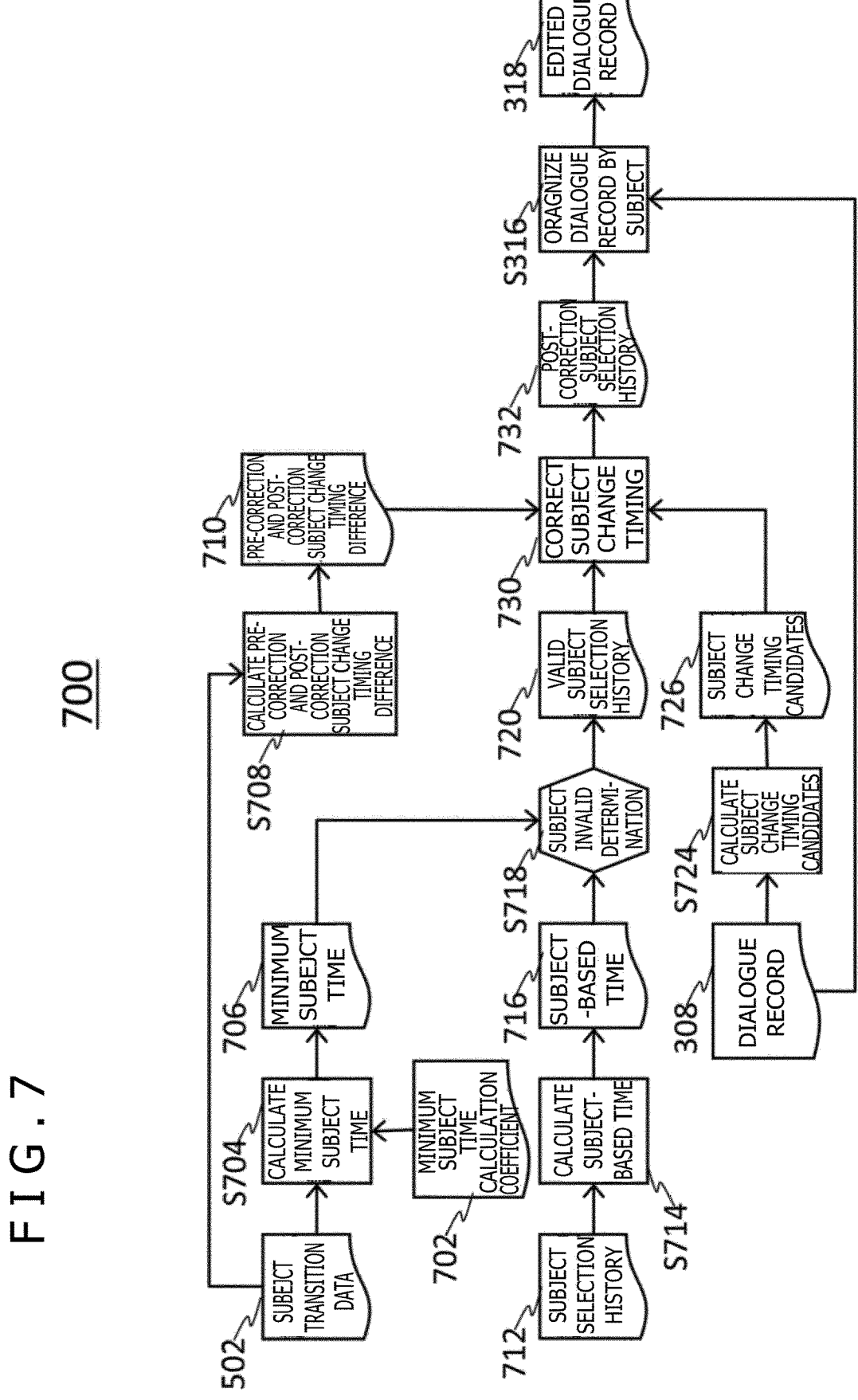
FIG. 7 is a diagram illustrating an example of a flow of a dialogue record timing correction process according to the embodiment of the present disclosure.

FIG. 7 is a diagram illustrating an example of a flow of a dialogue record timing correction process 700 according to the embodiment of the present disclosure. The dialogue record timing correction process 700 illustrated in FIG. 7 is a process for correcting each of the start time and the end time (the first start time and the first end time) for the subject that are designated by a speaker who is a participant of the digital dialogue to time that is more accurate (the second start time and the second end time), and is performed by the dialogue editing section 216 included in the dialogue management apparatus 210.

As described above, in one mode of the present disclosure, while a dialogue is being held, the subject selection list 302 for selecting the current subject from among the candidates prepared beforehand is displayed on the dialogue interface 306, and inputs of subject designation information designating the subject tag indicating the current subject and the start time and the end time for the current subject are received from participants of the dialogue.

However, at the time of inputting the subject designation information, the start time and the end time for the subject that have been designated by the speaker may be different from the actual start time and end time for the subject. This is likely to occur in a case where the speaker accidentally selects the start time for the new subject at an early point in time or a case where the speaker forgets to select the start time for the subject and selects the start time in delay, for example.

As such, one mode of the dialogue record timing correction process 700 according to the embodiment of the present disclosure relates to correcting each of the start time and the end time for the subject that have been designated by a speaker who is a participant of the digital dialogue to time that is more accurate. The more accurate changed time for the subject may, for example, be determined by analyzing a change in the facial expression, movement of the mouth, change in words, and the like of the speaker that are indicated in the digital dialogue. In this way, correcting each of the start time and the end time for the subject to time that is more accurate makes it possible to generate the edited dialogue record that is labeled more accurately.

First, in step S704, the dialogue editing section 216 calculates minimum subject time 706 used for subject invalidation determination described below, in reference to the subject transition data 502 and a minimum subject time calculation coefficient 702.

In performing the dialogue record timing correction process 700, in order to correct each of the start time and the end time for the subject that have been designated by a speaker who is a participant of the digital dialogue to time that is more accurate, subjects that do not satisfy a predetermined length threshold (that is, subjects that are discussed for only a short period of time) are desirably excluded. The minimum subject time 706 is information indicating the length threshold for distinguishing between valid subjects and invalid subjects in performing the timing correction. In the following description, the length of time from the start time of a specific subject to the end time of the specific subject will be called the "subject time" for convenience of description.

The minimum subject time 706 may be set beforehand by an administrator or the like or may be calculated from the subject transition data 502 and the minimum subject time calculation coefficient 702. In this case, the dialogue editing section 216 may determine the shortest subject time from the pieces of subject transition data collected beforehand, in reference to the pre-correction time and the post-correction time that are included in the relevant subject transition data, and calculate the minimum subject time 706 by multiplying the determined shortest subject time by the minimum subject time calculation coefficient 702 set beforehand.

In step S708, the dialogue editing section 261 calculates a pre-correction and post-correction subject change timing difference 710 in reference to the subject transition data 502.

In performing the dialogue record timing correction process 700, it is desirable that the start time and the end time for the subject that have been designated by a speaker who is a participant of a digital dialogue be corrected to subject change timing candidates each having a small difference with each of the start time and the end time for the subject having been designated by the speaker. Accordingly, here, the dialogue editing section 216 calculates the pre-correction and post-correction subject change timing difference 710, as a threshold for excluding, from among the subject change timing candidates that have a large difference with the start time and the end time for the subject that have been designated by the speaker.

Here, the dialogue editing section 216 may calculate an average value for the difference between each of the pre-correction subject start time and the pre-correction subject end time in the past subject transition data 502 and each of the post-correction subject start time and the post-correction subject end time, and use the calculated average value as the pre-correction and post-correction subject change timing difference 710 (time difference threshold).

In step S714, the dialogue editing section 216 calculates the subject time of each subject, in reference to the subject selection history 712 of the target dialogue record (that is, information indicating every subject start time and every subject end time designated with respect to the relevant dialogue record). In one example, the dialogue editing section 216 may determine that the subject time of the first subject is 3 minutes 47 seconds, the subject time of the second subject is 27 seconds, and the subject time of the third subject is 8 minutes 16 seconds, and output these pieces of information as subject-based time 716.

In step S718, the dialogue editing section 216 performs subject invalidation determination in reference to the minimum subject time 706 calculated in step S704 and the subject-based time 716 calculated in step S714. The subject invalidation determination here is determination for distinguishing between valid subjects and invalid subjects in performing timing correction. The dialogue editing section 216 compares the subject-based time 716 calculated in step S714 with the minimum subject time 706 calculated in step S704, to thereby determine whether or not the subject time of the relevant subject satisfies the minimum subject time 706, for each subject included in the dialogue record. The dialogue editing section 216 then excludes subjects that do not satisfy the minimum subject time 706 as invalid subjects and outputs the valid subject selection history 720 that includes only the subjects that satisfy the minimum subject time 706.

In step S724, the dialogue editing section 216 analyzes the dialogue record 308 to determine the subject change timing candidate 726 that is a candidate for the new start time and the new end time for the subject (that is, the start time and the end time that are more accurate than the subject start time and the subject end time that have been designated by a speaker who is a participant of the digital dialogue). Here, the dialogue editing section 216 may analyze the dialogue record 308 with use of predetermined face recognition means or speech analysis means. For example, the dialogue editing section 216 may determine the subject change timing candidate 726 by analyzing the opening statements may by a speaker, change in facial expression, and/or change in words of the speaker with use of such analysis means as speaker separation, speech analysis, and automatic speech recognition.

In step S730, the dialogue editing section 216 generates a post-correction subject selection history 732 in reference to the pre-correction and post-correction subject change timing difference 710 calculated in step S708, the valid subject selection history 720 generated in step S718, and the subject change timing candidate calculated in step S724.

More specifically, the dialogue editing section 216 corrects, in a case where there are subject start time and subject end time whose difference with the subject change timing candidate 726 is equal to or smaller than the pre-correction and post-correction subject change timing difference 710 in the valid subject selection history 720, the subject start time and the subject end time to the subject change timing candidate 726.

Examined as one example is a case in which "01:30" is included in the valid subject selection history 720 as the start time for the first subject designated by the speaker, while "01:28," "02:30," and "03:30" are included in the subject change timing candidate 726 as the change timing candidates for the start time for the first subject, and the pre-correction and post-correction subject change timing difference 710 is "5 seconds." In this case, the difference between the change timing candidate that is "01:28" and the start time for the first subject designated by the speaker that is "01:30" is within "5 seconds" that is defined by the pre-correction and post-correction subject change timing difference 710. Thus, the change timing candidate that is "01:28" is adopted, and the start time for the first subject that has been "01:30" is corrected to "01:28."

Performing the process described above on every subject start time and every subject end time included in the valid subject selection history 720 makes it possible to generate the post-correction subject selection history 732 in which the subject start time and the subject end time designated by a speaker who is a participant of the digital dialogue are each corrected to time that is more accurate.

Next, in step S316, the dialogue editing section 216 edits the dialogue record 308 in reference to the post-correction subject selection history 732 generated in step S730, to generate an edited dialogue record 318 in which the subject start time and the subject end time designated by a speaker who is a participant of the digital dialogue are each corrected to time that is more accurate and which is organized by subject.

According to the dialogue record timing correction process 700 described above, in a case where the subject start time and the subject end time designated by a speaker are different from the actual subject start time and the actual subject end time, the subject start time and the subject end time designated by the speaker are corrected to the time determined by such analysis means as face recognition and speech analysis, so that an edited dialogue record that is labeled more accurately can be generated.

Next, a useful subject transition data registering process according to the embodiment of the present disclosure will be explained with reference to FIG. 8.

FIG. 8 is a diagram illustrating an example of a flow of a useful subject transition data registering process 800 according to the embodiment of the present disclosure. The useful subject transition data registering process 800 illustrated in FIG. 8 is a process for registering useful subject transition data and is performed by the dialogue editing section 216 included in the dialogue management apparatus 210.

In the dialogue interface rendering process 500 and the dialogue record timing correction process 700 described above, the subject transition data 502 indicating information concerning transition from one subject (first subject) to another subject (second subject) is used. For example, in the dialogue interface rendering process 500, the subject transition data 502 is used for the subject forming process for displaying, in a highlighted manner, the subject candidate with high relevance to the current subject in the subject selection list 302. Further, in the dialogue record timing correction process 700, the subject transition data 502 is used for calculating an appropriate pre-correction and post-correction subject change timing difference 710.

However, when the subject transition data 502 in which subject transition is inappropriate (for example, subject transition is logically strange) is used, the accuracy of the abovementioned processes may decline. As such, the useful subject transition data registering process 800 according to the embodiment of the present disclosure relates to picking out and registering useful subject transition data that includes appropriate subject transition and that improves the accuracy of the dialogue interface rendering process 500 and the dialogue record timing correction process 700.

First, in step S802, the dialogue editing section 216 generates an evaluation item-based dialogue record 804 which is a dialogue record organized by evaluation item, in reference to the edited dialogue record 318, the relevant material 506, the evaluation item/subject correspondence table 508, and the participant memo 522. The evaluation item-based dialogue record 804 is different from the edited dialogue record 318 that is organized by subject, in being organized by evaluation item.

More specifically, the dialogue editing section 216 may generate the evaluation item-based dialogue record 804 by identifying the subjects that correspond to the same evaluation item and organizing the dialogue recorded portions corresponding to the identified subject, in reference to the edited dialogue record 318, the relevant material 506, the evaluation item/subject correspondence table 508, and the participant memo 522. In a case where a plurality of different subjects correspond to the same evaluation item in the evaluation item-based dialogue record 804, the plurality of subjects may be combined to form one "subject group."

Next, in step S806, the dialogue editing section 216 calculates evaluation item-based certainty 808 which is a degree of certainty of the subject group for each evaluation item, in reference to the evaluation item-based dialogue record 804. The evaluation item-based certainty 808 here is a scale indicating the usefulness of the relevant subject group for evaluating a predetermined evaluation item, with respect to each subject group in the evaluation item-based dialogue record 804.

Here, any of the following two methods may be used as the method for calculating the evaluation item-based certainty 808.

In the first method, the dialogue editing section 216 uses the feature quantity (for example, features of facial expression or voice) from the past evaluation item-based dialogue record 804 and the evaluation result corresponding to the relevant evaluation item-based dialogue record 804, as training data, and learns the prediction model with use of XGboost or the like. Thereafter, the dialogue editing section 216 may input the evaluation item-based dialogue record 804 that is the processing target to the prediction model learned as described above, and use the degree of certainty of the prediction model to be used at the time of calculating the feature quantity of the evaluation item-based dialogue record 804 (identifying the facial expression or voice for each frame and calculating the number of frames for each facial expression or voice), as the evaluation item-based certainty 808.

In the second method, the dialogue editing section 216 may use the prediction model learned as described above, to calculate a new feature quantity (for example, the feature of the facial expression or voice) from the evaluation item-based dialogue record 804 and predict the evaluation result, and thereby use the prediction probability of the prediction model as the evaluation item-based certainty 808.

Next, in step S810, the dialogue editing section 216 calculates subject-based certainty 812 indicating the degree of certainty of each subject, in reference to the evaluation item-based certainty 808. As described above, the evaluation item-based certainty 808 is a value indicating the degree of certainty of each subject group that is obtained by combining a plurality of subjects and that corresponds to each evaluation item. In order to pick out highly useful subject transition data, it is desirable that the degree of certainty of each subject be calculated.

Here, the dialogue editing section 216 may calculate the subject-based certainty 812 by averaging the certainty of each subject group indicated by the valuation item-based certainty 808 for each subject.

As one example, with respect to the first evaluation item, the degree of certainty of the first subject group including the first subject and the third subject is assumed to be "0.3," while, with respect to the second evaluation item, the degree of certainty of the second subject group including the second subject and the third subject is assumed to be "0.8."

In this case, the first subject is included only in the first subject group corresponding to the first evaluation item, and thus has the degree of certainty of "0.3." Further, the second subject is included only in the second subject group corresponding to the second evaluation item, and thus has the degree of certainty of "0.8." Meanwhile, the third subject is included both in the first subject group corresponding to the first evaluation item and the second subject group corresponding to the second evaluation item, and thus has the degree of certainty of "0.55" which is an average value of "0.3" and "0.8."

Next, in step S816, the dialogue editing section 216 picks out useful subject transition data 502, in reference to the subject-based certainty 812 calculated in step S810, a subject-based certainty transition threshold 814 set beforehand, and the post-correction subject selection history 732 generated in the dialogue record timing correction process 700 described above. Here, the dialogue editing section 216 generates all kinds of combinations with use of the subjects for which the subject-based certainty 812 has been calculated in step S810 and uses, for each combination, the average value of the subject-based certainty 812 as the degree of subject transition certainty indicating the usefulness of the combination as the subject transition.

As one example, in a case of a combination of the first subject whose degree of certainty is "0.3" and the second subject whose degree of certainty is "0.8," the degree of subject transition certainty indicating the validity in the case of a transition from the first subject to the second subject is "0.55" which is an average value of "0.3" and "0.8." Further, in the case of a combination of the second subject whose degree of certainty is "0.8" and the third subject whose degree of certainty is "0.55," the degree of subject transition certainty indicating the validity in the case of a transition from the second subject to the third subject is "0.675" which is an average value of "0.8" and "0.55."

After calculating the degree of subject transition certainty, the dialogue editing section 216 registers, as the valid subject transition data 502, a combination of subjects having a degree of subject transition certainty that is equal to or greater than the subject-based certainty transition threshold 814 set beforehand, and excludes, from the targets of the dialogue record timing correction process 700, combinations of the subjects that have a degree of subject transition certainty that is smaller than the subject-based certainty transition threshold 814 set beforehand.

Here, the dialogue editing section 216 may register the subject transition data 502 by storing the subject transition data 502 determined to be valid in a database available in the dialogue interface rendering process 500 and the dialogue record timing correction process 700, for example.

The useful subject transition data registering process 800 described above makes it possible to pick out and register useful subject transition data that includes appropriate subject transition and improves the accuracy of the dialogue interface rendering process 500 and the dialogue record timing correction process 700.

The dialogue management means according to the embodiment of the present disclosure makes it possible to generate an edited dialogue record that is organized by subject, even for a dialogue in which various subjects are discussed, for example.

Further, according to one mode of the embodiment of the present disclosure, a subject candidate that has high relevance to the current subject can be displayed in a highlighted manner in the subject selection list. This saves the effort of searching for and selecting the desired subject and allows the participants of the dialogue who input the subject designation information to easily select the subject candidate that has high relevance to the current subject.

Further, according to one mode of the embodiment of the present disclosure, a relevant material (for example, an evaluation criterion for the evaluation item or the like) that has high relevance to the current subject can be displayed on the dialogue interface. This enables the participants of the dialogue to easily check materials with high relevance while holding a dialogue.

Furthermore, according to one mode of the embodiment of the present disclosure, the subject start time and the subject end time designated by a speaker who is a participant of a digital dialogue can each be corrected to time that is more accurate and that is determined by the change in facial expression, movement of the mouth, and change in words of the speaker that are indicated in the dialogue record, for example. This makes it possible to generate an edited dialogue record that is labeled more accurately.

An embodiment of the present invention has been described above, but the present invention is not limited to the embodiment described above; various changes can be made within the scope not departing from the gist of the present invention.

DESCRIPTION OF REFERENCE SYMBOLS

200: Dialogue management system
210: Dialogue management apparatus
212: Dialogue interface section
214: Subject management section
216: Dialogue editing section
220: First dialogue apparatus
225: Communication network
230: Second dialogue apparatus
300: Subject-based dialogue record generating process
500: Dialogue interface rendering process
700: Dialogue record timing correction process
800: Useful subject transition data registering process

The invention claimed is:

1. A dialogue management apparatus that is capable of communicating with at least one or more dialogue apparatuses, wherein
   a dialogue interface section
      provides a dialogue interface for holding a digital dialogue between a plurality of speakers to the dialogue apparatus, and
      acquires a dialogue record of the digital dialogue,
   a subject management section
      receives from the dialogue apparatus an input of subject designation information for designating a subject in the digital dialogue in reference to a subject selection list including a plurality of subject candidates, while the digital dialogue is being held, a dialogue editing section
 generates an edited dialogue record that is organized by subject, by editing the dialogue record in reference to the subject designation information, and
 generates an evaluation item-based dialogue record that is organized by evaluation item, in reference to the edited dialogue record and an evaluation item/subject correspondence table indicating a correspondence relation between an evaluation item and a subject that are evaluation targets.

2. The dialogue management apparatus according to claim 1, wherein
 the dialogue record
 includes audio information or image information corresponding to the digital dialogue or both of them.

3. The dialogue management apparatus according to claim 1, wherein
 the subject management section
 displays the subject selection list including a plurality of subject candidates on the dialogue interface.

4. The dialogue management apparatus according to claim 3, wherein
 the subject management section
 receives, as the subject designation information, a first subject tag selected from the subject selection list, first start time for a first subject, and first end time for the first subject, in reference to the input of a corresponding one of the speakers, and
 associates the first subject tag with a first subject recorded portion corresponding to the first start time for the first subject and the first end time for the first subject.

5. The dialogue management apparatus according to claim 4, wherein
 the dialogue editing section
 determines second start time for the first subject and second end time for the first subject by analyzing the dialogue record by predetermined analysis means,
 calculates a time difference between the second start time for the first subject and the first start time for the first subject, the first start time being included in the subject designation information, by comparing the second start time for the first subject with the first start time for the first subject,
 calculates a time difference threshold in reference to subject transition data indicating information concerning a transition between subjects in a previous dialogue, and,
 in a case where the time difference satisfies the time difference threshold, deletes the first subject tag from the first dialogue recorded portion and associates the first subject tag with a second dialogue recorded portion corresponding to the second start time for the first subject and the second end time for the first subject.

6. The dialogue management apparatus according to claim 5, wherein
 the analysis means
 is analysis means configured to analyze any one of a change in facial expression, movement of mouth, or a change in words of a corresponding one of the speakers.

7. The dialogue management apparatus according to claim 4, wherein
 the dialogue editing section
 generates the edited dialogue record that is organized by subject, by extracting dialogue recorded portions associated with the first subject tag from the dialogue record and organizing the extracted dialogue recorded portions.

8. A dialogue management system in which a first dialogue apparatus used by a first speaker, a second dialogue apparatus used by a second speaker, and a dialogue management apparatus for holding a digital dialogue between the first speaker and the second speaker are connected to one another via a communication network, wherein
 the dialogue management apparatus includes
 a dialogue interface section that provides a dialogue interface for holding a digital dialogue between the first speaker and the second speaker to the first dialogue apparatus and the second dialogue apparatus and acquires a dialogue record of the digital dialogue,
 a subject management section that receives an input of subject designation information for designating a subject in the digital dialogue in reference to a subject selection list including a plurality of subject candidates, while the digital dialogue is being held, and
 a dialogue editing section that generates an edited dialogue record that is organized by subject, by editing the dialogue record in reference to the subject designation information, and generates an evaluation item-based dialogue record that is organized by evaluation item, in reference to the edited dialogue record and an evaluation item/subject correspondence table indicating a correspondence relation between an evaluation item and a subject that are evaluation targets.

9. A dialogue management method used in a dialogue management apparatus capable of communicating with at least one or more dialogue apparatuses, comprising:
 a step of providing a dialogue interface for holding a digital dialogue between a plurality of speakers to the dialogue apparatus;
 a step of displaying a subject selection list including a plurality of subject candidates on the dialogue interface;
 a step of starting recording of the digital dialogue;
 a step of receiving, as subject designation information, a first subject tag selected from the subject selection list, first start time for a first subject, and first end time for the first subject, in reference to an input from a corresponding one of the speakers;
 a step of associating the first subject tag with a first dialogue recorded portion corresponding to the first start time for the first subject and the first end time for the first subject;
 a step of ending the recording of the digital dialogue and acquiring a dialogue record; and
 a step of generating an edited dialogue record that is organized by subject, by extracting dialogue recorded portions associated with the first subject tag from the dialogue record and organizing the extracted dialogue recorded portions.

\* \* \* \* \*